United States Patent
Duval

[11] Patent Number: 5,887,984
[45] Date of Patent: Mar. 30, 1999

[54] BEARING ASSEMBLY WITH SPRING-BIASED SEALS

[75] Inventor: Roland Duval, Bennwihr, France

[73] Assignee: The Timken Company, Canton, Ohio

[21] Appl. No.: 963,284

[22] Filed: Nov. 3, 1997

[30] Foreign Application Priority Data

Nov. 6, 1996 [GB] United Kingdom .................... 9623126

[51] Int. Cl.$^6$ ...................................................... F16C 19/38
[52] U.S. Cl. ........................... 384/477; 384/563; 384/569
[58] Field of Search .................................... 384/477, 518, 384/517, 563, 569, 571

[56] References Cited

U.S. PATENT DOCUMENTS

| | | |
|---|---|---|
| 1,787,459 | 1/1931 | Tawresey . |
| 1,788,966 | 1/1931 | Wilson . |
| 1,930,312 | 10/1933 | Greenhoe . |
| 2,050,166 | 8/1936 | Dahlstrom . |
| 2,077,881 | 4/1937 | Gits . |
| 2,156,719 | 5/1939 | Berer . |
| 2,195,877 | 4/1940 | Steedman . |
| 2,277,771 | 3/1942 | McNab . |
| 2,347,118 | 4/1944 | Matter . |
| 2,358,830 | 9/1944 | Schick . |
| 2,363,110 | 11/1944 | Krug . |
| 2,383,667 | 8/1945 | Matter . |
| 2,399,764 | 5/1946 | Schilling . |
| 2,500,898 | 3/1950 | Hastings . |
| 2,571,035 | 10/1951 | Hastings . |
| 2,858,149 | 10/1958 | Laser . |
| 2,943,872 | 7/1960 | Cahill et al. . |
| 4,799,808 | 1/1989 | Otto . |
| 4,943,069 | 7/1990 | Jinnouchi . |

Primary Examiner—Lenard A. Footland
Attorney, Agent, or Firm—Polster, Lieder, Woodruff & Lucchesi, L.C.

[57] ABSTRACT

A double row tapered roller bearing for transferring axial loads includes an inner race having two tapered raceways, an outer race in the form of two rings, each having a tapered raceway presented toward a tapered raceways of the inner race, and tapered rollers arranged in two rows between the raceways of the inner and outer races, with the large ends for the rollers of the two rows being presented toward each other. The bearing fits into a housing with a loose fit between the rings of the outer race and the housing. Two seals, which are fitted to the rings of the outer race, isolate the interior of the bearing from the surrounding environment. Each seal includes a case that fits around one of the rings of the outer race and along the end of that ring, all such that the ring can shift axially with respect to the seal case. In addition, each seal has a flexible seal element which establishes a static fluid barrier with the confronting wall of the housing and another flexible seal element which establishes a dynamic fluid barrier with the inner race. Each outer ring carries springs which bear against the case of the seal carried by the element and urge the flexible seal element against the confronting wall of the housing while seating the rollers within it against the raceways along which it rolls, thus imparting a preload to the bearing.

19 Claims, 2 Drawing Sheets

BEARING ASSEMBLY WITH SPRING-BIASED SEALS

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

The present invention relates to a bearing assembly and, in particular, to a bearing assembly suitable for providing a pre-loaded, self-sealed, bearing unit adapted to operate under axial loads.

In some rolling mills the rolls which deform the shape that passes through the mill are carried by plain sleeve bearings which take the separating force imposed by the shape. Thrust loads, on the other hand, are taken by antifriction bearing assemblies which are generally mounted with internal radial and axial clearances. The outer races of these bearing assemblies are generally mounted with a radially loose fit in a housing and do not transmit any radial load to the bearing, while the inner race is securely mounted on the shaft which is to rotate relative to the housing. Between the inner and outer races solid rolling elements are arranged in rows and are submitted to varying amounts of skew in any unloaded row, depending on the amount of radial clearance in the bearing assembly. Skewing often results in the oil film between the rolling elements and their respective races being broken. This in turn may result in metal-to-metal contact which will cause the bearing assembly to deteriorate more quickly than would otherwise be the case.

BRIEF SUMMARY OF THE INVENTION

According to the present invention, there is provided a bearing assembly for mounting in a housing, the bearing assembly comprising an inner race, an outer race, and a plurality of rolling elements located therebetween, said bearing assembly further comprising means which permits relative axial movement between the housing and the one outer race, but prevents relative circumferential movement between the housing and the one outer race; and a seal provided at one or both ends of the bearing assembly, said seal having engagement means for engaging with a respective outer race and a respective inner race, wherein said engagement means permits relative axial movement between the seal and the respective outer race, inner race or both.

Preferably, the means includes axial biasing or preloading means, which may preferably be biased away from the bearing assembly, at one or both ends of the bearing assembly. When the bearing assembly is mounted in a housing, the biasing means may act against an axially facing surface of the housing, preferably via the seal and thus may act to maintain the rolling elements of a row of the bearing assembly correctly seated even when it is unloaded. By maintaining any unloaded bearing rows correctly seated during operation of the bearing assembly, skewing of the unloaded bearing row is prevented; skewing may result in a breakdown or lubrication between rolling elements and races which will result in metal-to-metal contact and thus early deterioration of the bearing. It is thus advantageous if such skewing can be avoided. The biasing means may act to apply a preload to the bearing assembly, thereby preventing skewing of any unloaded rolling elements.

Preferably the bearing assembly is adapted to work purely under an axial load and especially in circumstances involving large axial loads such as those encountered in certain rolling mills where the radial loads that are produced by shapes passing through such mills are taken by other bearings. In these circumstances the bearing assembly may, for example, take the form of an angular contact ball bearing, a spherical thrust bearing assembly or a tapered roller bearing. It is advantageous for the bearing assembly to be adapted to work purely under an axial load because in this situation there need be no engagement between the radially outer surface of the bearing assembly and the adjacent radially inner surface of the housing in which the bearing assembly is located, which might reduce the freedom of axial movement of the outer race of the bearing assembly.

In order to seal the bearing assembly, a seal is provided at one or both ends of the bearing assembly. Ideally, the seal may be a single annular component having a static radial, outer sealing element at an outer circumferential edge region of the seal and a dynamic, internal sealing element at a radially inner edge region of the seal. In this way, two separate sealing functions are met in a single component. Preferably, the engagement means permits relative axial movement between its respective bearing row and the static sealing element. The engagement means may detachably secure the seal to the bearing assembly or alternatively the engagement means may provide only a loose fit onto the bearing assembly. In this way, the bearing assembly may be sold and mounted as a single unit. Where the seal attaches to the outer race, the engagement means is arranged to allow relative axial movement between the outer race and the seal. In this way, when the bearing assembly is mounted within a housing, the static sealing element may remain substantially static with respect to the housing, while the outer race may move relative to the housing and the sealing element in an axial direction in order, for example, to absorb alternating axial loads transmitted to the bearing assembly. Ensuring that the static sealing element remains substantially static with respect to the housing regardless of any movement of the outer race is advantageous because the effectiveness of a static sealing element is impaired unless it does in fact remain static with respect to the surface which it is sealing.

Where the bearing assembly includes an axial biasing means and a seal located at the same end, the axial biasing means is preferably loaded between the outer race and the seal and acts to bias the seal away from the outer race. Preferably, a biasing means and a seal are provided at both ends of the bearing assembly. By this arrangement, the opposing seals may be biased axially outwardly against the housing in static relation thereto, while the outer race has limited freedom of movement axially between the seal, relative to the housing and the seals. In this arrangement the biasing means continues to act against an axially facing surface of the housing, albeit that the action is via the seal. The bearing assembly may be a two row tapered bearing assembly having a unitary inner race and a pair of outer rings forming the outer race, the assembly being arranged such that the larger diameter ends of the tapered rollers face axially inwardly towards the axial center of the bearing assembly. In this way each biasing means acts to preload its respective bearing row of inner race, outer ring and tapered rollers.

The static sealing elements preferably comprises a flexible axial lip which is axially directed and seals against an axially facing surface of the housing. This is advantageous because it enables the biasing means to positively clamp the flexible axial lip against the surface to be sealed. The static sealing element may further comprise a flexible radial lip which can provide a secondary sealing action. Furthermore, the seal may further comprise a circular axially outwardly projecting ridge. This ridge can provide an additive barrier against contaminants, especially when an outer race locking pin is used to lock the outer race in a circumferentially fixed position relative to the housing.

Preferably, the seal is similar to the seal as described in co-pending U.S. patent application Ser. No. 08/628,092 and corresponding European Patent Application No. EP-A-0737821. In this case though the seal is adapted by omitting the attachment means, in the form of an inner shoulder for example, which attaches to the outer race in a manner preventing or restricting relative axial movement between the seal and the bearing assembly. In this way, the numerous advantages of the present invention as set out above may be enjoyed together with the advantages provided by the seal described in the foregoing applications.

BRIEF DESCRIPTION OF THE SEVERAL VIEWS OF THE DRAWINGS

In order that the present invention may be better understood, embodiments thereof will now be described by way of example only, with reference to the accompanying drawings in which.

DETAILED DESCRIPTION OF THE INVENTION

Figure 1:
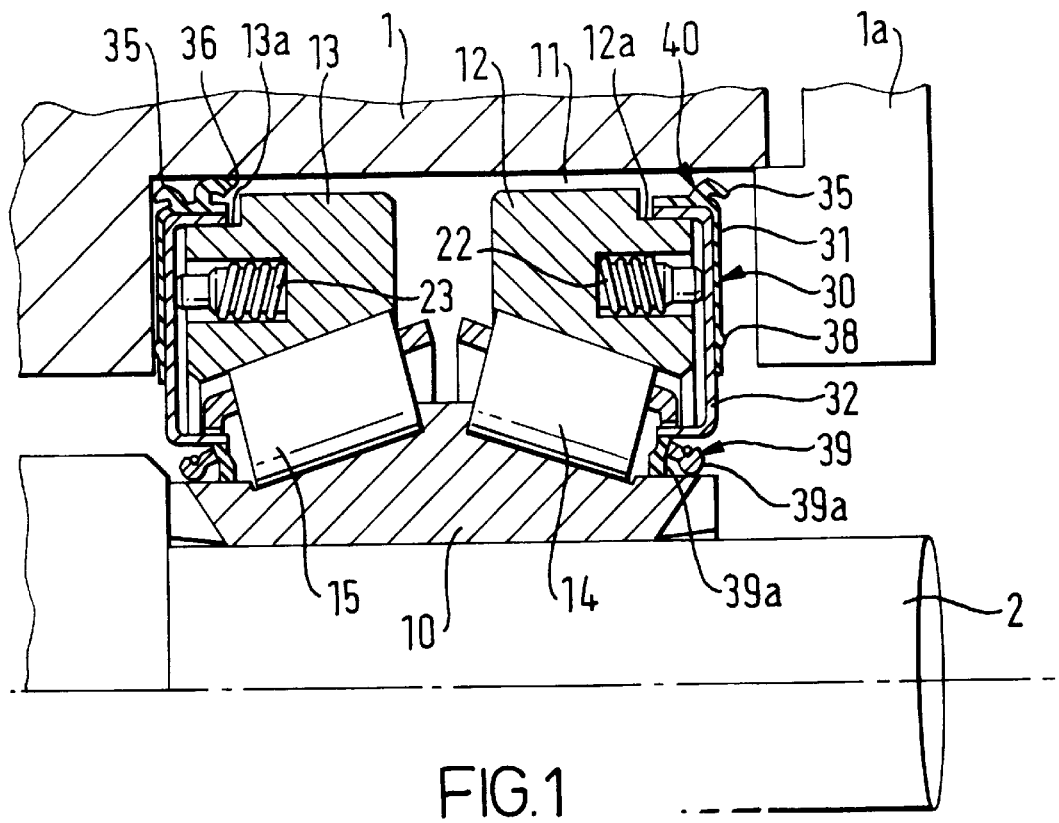
FIG. 1 is a cross-sectional view of a bearing assembly according to the present invention, showing the bearing assembly during installation in the housing which contains it.

The bearing assembly shown in FIG. 1 comprises an inner race 10, an outer race in the form of a pair of outer rings 12, 13, and rolling elements in the form of tapered rollers 14, 15 which roll along tapered raceways on the inner race 10 and the rings 12, 13 of the outer race. The inner race 10 is securely mounted on a shaft 2 having an axis X, which is the axis of rotation for the bearing assembly. The outer rings 12, 13 are mounted within a housing 1 in a manner which allows limited, relative axial movement between the housing 1 and the outer rings 12, 13. The radial gap 11 between the outer rings 12,13 and the housing 1 has been enlarged for the sake of clarity. In reality the radial gap 11 would be much smaller than it appears in the figures. Each outer ring 12, 13 includes axial biasing means in the form of a plurality of axial spring systems 22, 23 respectively. Each axial spring system 22, 23 may be attached to a seal 30 by means of suitable seal attachment means (not shown). There is a small space between each seal 30 and the end face of its respective outer ring 12, 13 as shown in the figures, although in reality the space will be much smaller than it appears. Each seal 30 is preferably similar to the seal described in co-pending U.S. patent application Ser. No. 08/628,092 and its counterpart European Patent Application No. A-0737821, which are incorporated herein by reference. Unlike the seal described in U.S. patent application Ser. No. 08/628,092 and European Patent Application No. A-0737821, the outer static sealing element preferably does not include a ridge for engagement in grooves there provided in the radially outwardly facing shoulder portion 12a, 13a of the respective outer rings 12, 13. In this way the means for preventing relative axial movement between the seal 30 and the outer ring is omitted.

Each seal 30 has a substantially rigid casing 32, made for example of steel, which is generally planar and ring-shaped to enable the seal 30 to be located around the shaft 2. But the ring-shaped casing 32 does have inner and outer flanges which are directed axially. On the axially outwardly facing surface of the casing 32 a coating 31 of rubber or other similar resilient material is provided. Projecting axially outwardly from the coating 31 is a small sealing ridge 38 which may define a continuous circular sealing ridge on the axially outer surface of the seal 30. At the radially inner edge of the seal 30, there is provided a dynamic sealing element 39, and a radially outer edge of the seal 30 a static sealing element 40.

The dynamic sealing element 39 has two sealing lips 39a, 39b of which one is preferably made from rubber or another similar resilient material and the other 39b is preferably an elastohydro-dynamic (EHD) lip of the type described in detail in U.S. Pat. No. 4,799,808 and its counterpart European Patent No. 0304160 which are incorporated herein by reference.

The static sealing element 40 may also include two sealing lips 35, 36 (as shown on the seal at the left of FIG. 1) or it may include only one lip 35. Both lips 35, 36 are made of rubber or other similar resilient material, and one lip 35 extends radially upwardly and axially outwardly to seal against an axially facing surface of a locking member 1a that forms part of the housing 1. The other lip 36 extends radially outwardly to at least partially seal against a radially inwardly facing surface of the housing 1. This additional radial lip 36 is optional (and is thus not shown on the seal 30 at the right of FIG. 1).

Biasing means in the form of a plurality of springs 22, 23 are provided in small axially extending pockets formed in the outer rings 12, 13. The springs 22, 23 act between the seals 30 and the respective outer ring 12, 13.

Figure 2:
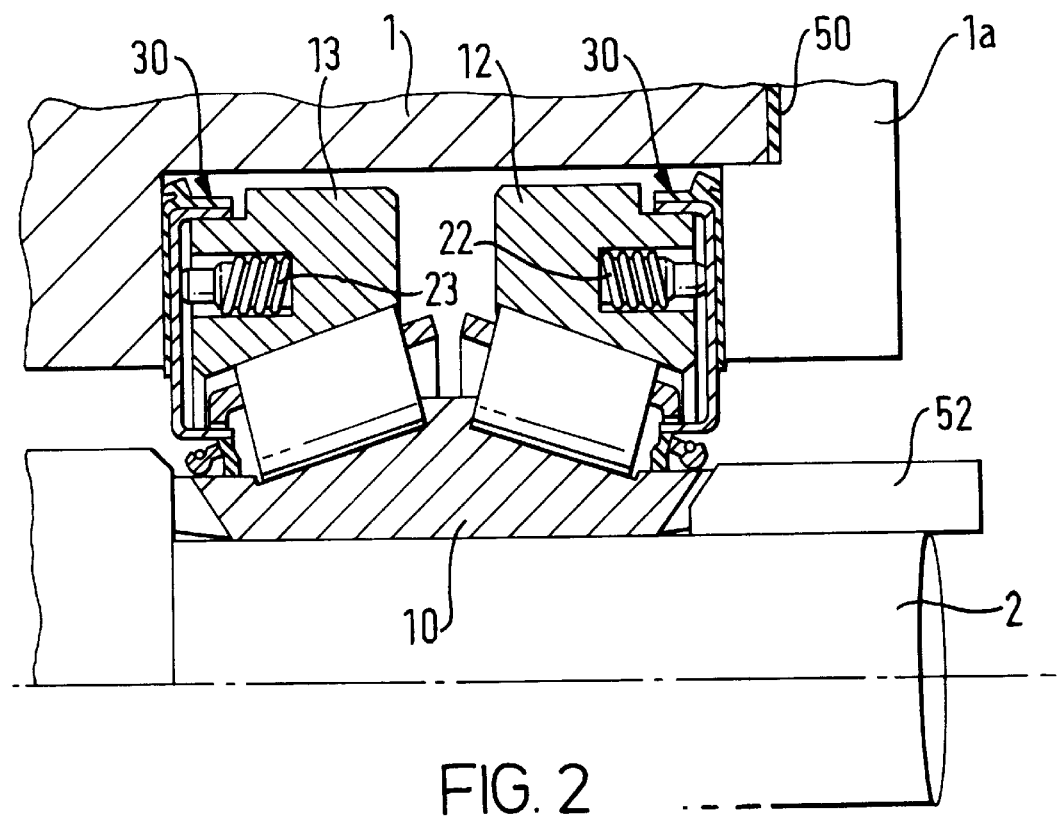
FIG. 2 is a view similar to FIG. 1 showing another bearing assembly according to the present invention when correctly mounted.

In order to mount the bearing assembly of FIG. 1, it is firstly necessary to mount the assembly in the housing 1. Thereafter, the locking member 1a, which essentially forms a part of the housing 1, is screwed or otherwise clamped into and against the main part of the housing 1 as is shown in FIG. 2. A compressible sealing gasket 50 or any other suitable gasket device is provided between the locking member 1a and the main part of the housing 1 where these two components axially abut one another. This gasket 50 provides the axial clearance, and therefore the necessary radial clearance in the bearing assembly, to perform properly when in use. This axial clearance will also enable the spring system to operate. When the bearing assembly is clamped in position by the locking member 1a, the springs 22, 23 press the seals 30 into tight sealing engagement with the housing 1, including its locking member 1a. Small axial movements of the outer rings 12, 12 (of the order of a few tenths of a millimeter- i.e. within the range 0.1–1.0 mm) may be permitted with this arrangement. These small axial movements though do not affect the engagement of the seals 30 with the housing 1 and member 1a by virtue of the springs 22, 23. Where the inner race 10 is initially a loose fit, in order to maintain it firmly in place on the shaft 2 during use, an inner ring locking key 52 is firmly mounted onto the shaft 2.

Figure 3:
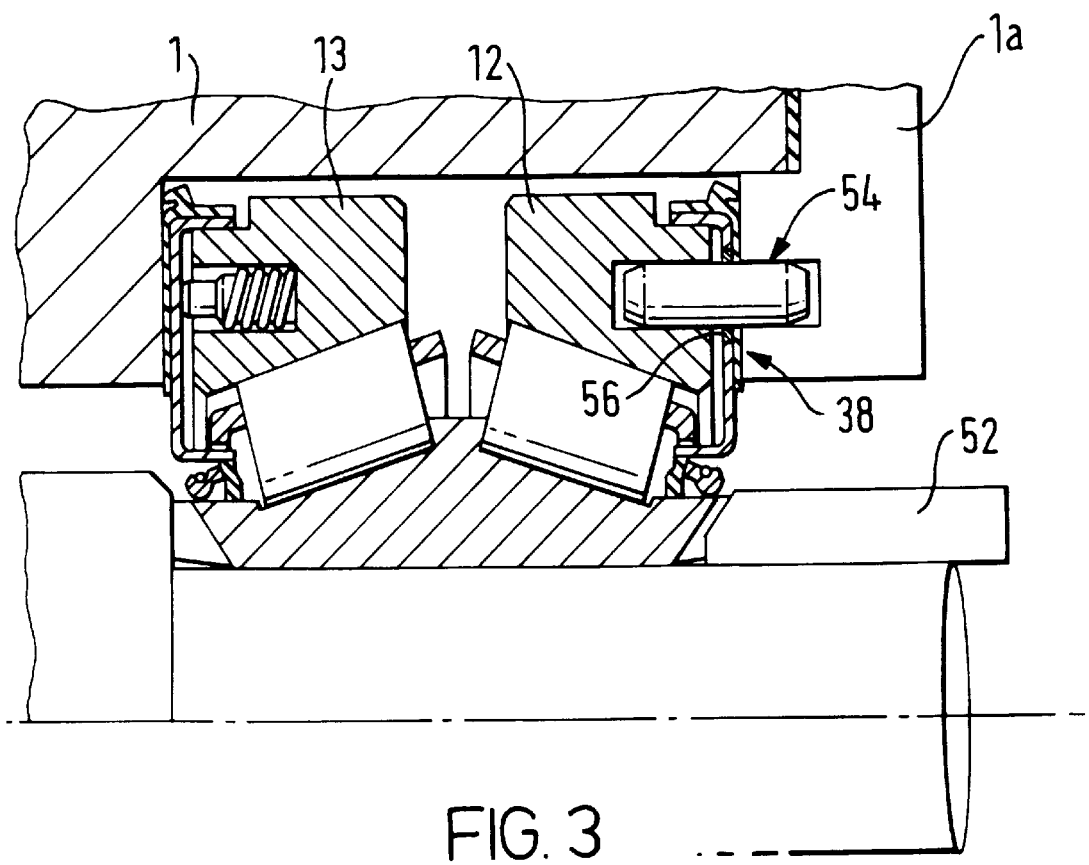
FIG. 3 is a view similar to FIGS. 1 and 2 showing another bearing assembly according to the present invention when correctly mounted and locked.
Figure 4:
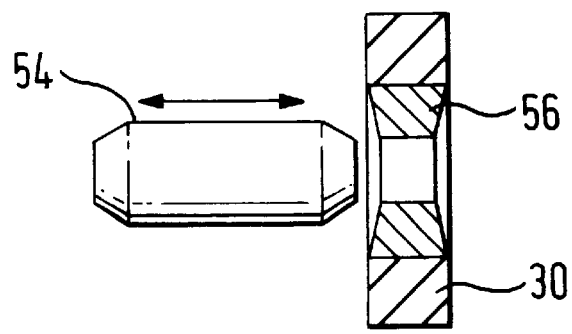
FIG. 4 is a diagrammatical, cross-sectional view showing the locking mechanism of FIG. 3 in greater detail.

FIG. 3 shows one of the outer rings 12 rotationally secured to the locking member 1a by means of a locking pin 54. A locking pin may also be used in a similar way between the other outer ring 13 and the main housing 1. In order to maintain a good seal when using a locking pin 54 it will be noted that the sealing ridge 38 (fully compressed in FIG. 3) is located adjacent but radially inwardly of the locking pin 54 (i.e. below the locking pin 54 as shown in FIG. 3). Furthermore, an additive annular sealing element 56 is provided within the seal 30 where the locking pin passes through the seal 30. This is more clearly seen in FIG. 4.

Although the invention has been particularly described in relation to a tapered roller bearing assembly, it will be understood that it is equally applicable to other forms of bearing assembly.

What is claimed is:

1. A bearing assembly for mounting in a housing, said bearing assembly comprising: an inner race, an outer race, and a plurality of rolling elements located therebetween, the outer race being capable of axial movement relative to the housing; and a seal provided at the end of the bearing assembly, said seal having engagement means for engaging with one or both of the outer race and the inner race, and wherein said engagement means permits relative axial movement between the seal and the outer race, inner race or both.

2. A bearing assembly as claimed in claim 1 wherein the engagement means includes axial biasing means biased away from the bearing assembly, at the end of the bearing assembly.

3. A bearing assembly as claimed in claim 2 wherein when the bearing assembly is mounted in a housing, and the biasing means acts against an axially facing surface of the housing, via the seal.

4. A bearing assembly as claimed in claim 3 wherein the axial biasing means is located between the outer race and the seal, said biasing means acting to bias the seal away from the outer race.

5. A bearing assembly as claimed in claim 4 wherein the biasing means comprises a number of springs disposed within pockets spaced at angular intervals around the outer race.

6. A bearing assembly as claimed in claim 5 wherein a biasing means and a seal are provided at both ends of the bearing assembly, whereby the opposing seals are biased axially outwardly against the housing in static relation thereto, while the outer race has limited freedom of movement axially between the seals, relative to the housing and the seals.

7. A bearing assembly as claimed in claim 6 wherein each seal is a single annular component having a static radially outer sealing element at an outer circumferential edge region of the seal and a dynamic, internal sealing element at a radially inner region of the seal.

8. A bearing assembly as claimed in claim 7 wherein the static sealing element comprises a flexible axial lip which is axially directed and seals against an axially directed surface of the housing.

9. A bearing assembly as claimed in claim 8 wherein the static sealing element further comprises a flexible radial lip which can provide a secondary sealing action.

10. A bearing assembly as claimed in claim 8 wherein each seal further comprises a circular axially outwardly projecting ridge for engagement with the housing.

11. A bearing assembly as claimed in claim 1 wherein the bearing assembly is a double row tapered roller bearing having a double inner race, a pair of outer rings forming the outer race, and tapered rollers arranged in two rows between the inner and outer races, with the larger diameter ends of the tapered rollers facing axially inwardly towards the axial center of the bearing assembly.

12. A bearing assembly for accommodating rotation about an axis and for transmitting axially directed loads, said bearing assembly comprising: an outer race having a raceway that is presented inwardly toward and is oblique to the axis, an inner race having a raceway that is also oblique to the axis and is presented outwardly toward the raceway of the outer race; rolling elements arranged in a row between raceways of the inner and outer races, whereby the rolling elements will transfer an axially directed load between the races when the load seats the rolling elements against the raceways; a seal fitted to the outer race such that the outer race can shift axially with respect to it, the seal including a rigid case and a first resilient sealing element configured to establish a fluid barrier with a surface against which it bears; and a spring carried by the outer race and acting against the seal to urge the seal axially away from the outer race and to seat the rolling elements against the raceways in preload.

13. A bearing assembly according to claim 12 wherein the case of the seal has a generally radially directed wall that lies along the outer race, and the spring acts against the radially directed wall.

14. A bearing assembly according to claim 13 wherein the first seal element of the seal has a lip which is directed generally axially.

15. A bearing assembly according to claim 14 wherein the case of the seal has an axially directed flange which encircles the outer race, yet is capable of accommodating axial movement of the outer race within it.

16. A bearing assembly according to claim 15 wherein the seal has a second seal element which establishes a dynamic fluid barrier with the inner race.

17. In combination, the bearing assembly of claim 12; and a housing into which the bearing assembly is fitted, there being a loose fit between the outer race of the bearing assembly and the housing, the housing including an end portion that lies axially beyond the bearing assembly; and wherein the spring urges the seal toward the end portion of the housing and maintains the first seal element in contact with the end portion of the housing.

18. The combination according to claim 17 wherein the first seal element of the seal has an axially directed lip which bears against the end portion of the housing and establishes a fluid barrier with it.

19. A double row bearing for accommodating rotation about an axis and being capable of transferring axially directed loads, said bearing comprising: a inner race having two tapered raceways presented outwardly away from the axis, with the large ends of the raceways being toward each other; an outer race including two rings, each having a tapered raceway presented around and facing one of the raceways on the inner race; tapered rollers arranged in two rows between the raceways of the inner and outer races, with the large end of the rollers in for the one row being presented toward the large ends of the rollers for the other row; a seal fitted to each ring of the outer race, each seal having a rigid case which fits around the race and also along the end of the race and an elastomeric seal element which, when not deflected, projects axially beyond the case; and springs carried by the rings of the outer race and applying an axially directed force against the seals for urging the seals axially away from the rings and for seating the rollers along the raceways.

* * * * *